United States Patent [19]

Brouwers

[11] Patent Number: 5,667,543
[45] Date of Patent: Sep. 16, 1997

[54] ROTATING PARTICLE SEPARATOR WITH NON-PARALLEL SEPARATING DUCTS, AND A SEPARATING UNIT

[75] Inventor: Jozef Johannes Hubertus Brouwers, Enschede, Netherlands

[73] Assignee: Romico Hold A.V.V., Netherlands

[21] Appl. No.: 553,471
[22] PCT Filed: Apr. 15, 1994
[86] PCT No.: PCT/NL94/00079
§ 371 Date: Feb. 22, 1996
§ 102(e) Date: Feb. 22, 1996
[87] PCT Pub. No.: WO94/23823
PCT Pub. Date: Oct. 27, 1994

[30] Foreign Application Priority Data

Apr. 16, 1993 [NL] Netherlands ............ 9300651

[51] Int. Cl.⁶ .................... B01D 21/26; B01D 45/12
[52] U.S. Cl. .................... 55/317; 55/407; 55/408; 210/188; 210/512.1; 494/76
[58] Field of Search ............ 210/188, 512.1; 55/317, 407, 408; 494/76

[56] References Cited

U.S. PATENT DOCUMENTS

| | | |
|---|---|---|
| 3,234,718 | 2/1966 | Sevin et al. ............ 55/317 |
| 4,994,097 | 2/1991 | Brouwers ............ 55/317 |
| 5,073,177 | 12/1991 | Brouwers ............ 55/317 |

FOREIGN PATENT DOCUMENTS

| | | |
|---|---|---|
| 0286160 | 10/1988 | European Pat. Off. . |
| 0532105 | 3/1993 | European Pat. Off. . |
| 1202388 | 1/1960 | France . |
| 513288 | 11/1930 | Germany . |
| 604927 | 10/1948 | United Kingdom . |
| 2036607 | 7/1980 | United Kingdom . |

OTHER PUBLICATIONS

Mathematics for Engineers and Scientist vol. 2, Brian H. Chirgwin and Charles Plumpton, p. 250 undated.

*Primary Examiner*—David A. Reifsnyder
*Attorney, Agent, or Firm*—Webb Ziesenheim Bruening Logsdon Orkin & Hanson, P.C.

[57] ABSTRACT

The invention relates to a separating body which can be set into rotation to separate solid or liquid particles of micron or submicron size from a fluid, wherein the body has a large number of separating ducts with singly connected walls over a substantial part of the axial length, where the walls of at least one of the separating ducts are not parallel to the axis of rotation. The tangent of the angle between the tangent planes of the walls of the separating duct and the axis of rotation is designated with tan $\alpha$, the radial width of the separating duct is designated with d, the length of the separating duct is designated with L and the rotation speed of the separating body is designated with $\Omega$ where these variables are chosen in mutual dependence in a manner such that the dimensionless number $(\Omega L d \tan \alpha)/\nu$ is located over a substantial part of the separating duct in the range up to 192, wherein $\nu$ is the kinematic viscosity of the fluid. The invention further relates to a separating unit provided with at least two separating bodies.

14 Claims, 3 Drawing Sheets

ROTATING PARTICLE SEPARATOR WITH NON-PARALLEL SEPARATING DUCTS, AND A SEPARATING UNIT

BACKGROUND OF THE INVENTION

1. Field of the Invention

The invention relates to a separating body which can be set into rotation for the purpose of separating solid or liquid particles of micron or sub-micron sire from a fluid, wherein the relevant body consists of a large number of separating ducts with singly connected walls over a substantial part of the axial length. The invention also relates to a rotating particle separator which consists of the above described separating body, onto which impellers may or may not be fixed upstream and downstream and wherein the separating body is mounted in a housing which is provided with a fluid inlet and fluid outlet, optionally with a separate outlet for removing separated particle material.

2. Description of the Prior Art

When a fluid is set into rotation, liquid or solid particles found in the relevant fluid will displace in a radial direction, wherein the distance of the particles from the axis of rotation increases. The velocity with which the particles are displaced in a radial direction depends on the magnitude of the centrifugal force acting on the particle as a result of the rotation and the resistant force the fluid exerts on a particle making a movement relative to the fluid. On the basis of these forces it can be calculated that in the case of a gas rotating at an angular speed of 300 rad/s a particle with an average diameter of 1 micron, an average specific mass of about 1000 $kg/m^3$ and situated on a radius of 0.1 m, displaces radially at a speed of about 0.03 m/s. Particles with average diameters of about 5 micron and about 0.05 micron will as a result of rotation generally be displaced radially, under practically realistic conditions, at respective speeds of about 0.1 m/s and about 0.001 m/s. If we assume that gas and particles remain in rotation for a residence time of about 0.2 s, this then implies that the said particles will arrive at a radially placed wall if the said wall is situated at a radial distance which is respectively about 20 mm and about 0.2 mm removed from the radial plane where the particles start their displacement. The use of a large number of walls placed at a short radial distance from each other and extending axially along the axis of rotation results in a configuration with which large amounts of gas can be purified of extremely small particles by means of centrifugal separation. The gas moves parallel to the radially placed walls and the axis of rotation, while the particles displace radially as a result of centrifugal action and are deposited on the outer walls of the separating ducts which are formed by the radially placed walls. Similar considerations also apply for a liquid fluid.

The above specified particle separator is known from the European patent specification 0286160 and the U.S. Pat. Nos. 4,994,097 and 5,073,177. A drawback of the known particle separator is that the separating ducts are parallel to the axis of rotation. The present invention is based on the new insight that within defined limits the separating ducts are placed non-parallel to the axis of rotation, which positively enhances the separating process.

SUMMARY OF THE INVENTION

Fluid which rotates and flows in a direction not parallel to the axis of rotation undergoes Coriolis forces. As a result convective flows occur in a plane perpendicular to the axis of rotation. Such convective flows can enhance the transport, primarily caused by centrifugal forces, of particles to the wall of a separating duct. Already at very small inclination of the separating ducts in relation to the axis of rotation, for instance when the tangent planes to the walls of these ducts form an angle of only a hundredth of a degree of arc relative to the axis of rotation, convective particle transport to the separating wall will make a noticeably positive contribution to the separating process.

DESCRIPTION OF THE PREFERRED EMBODIMENTS

Figure 1:
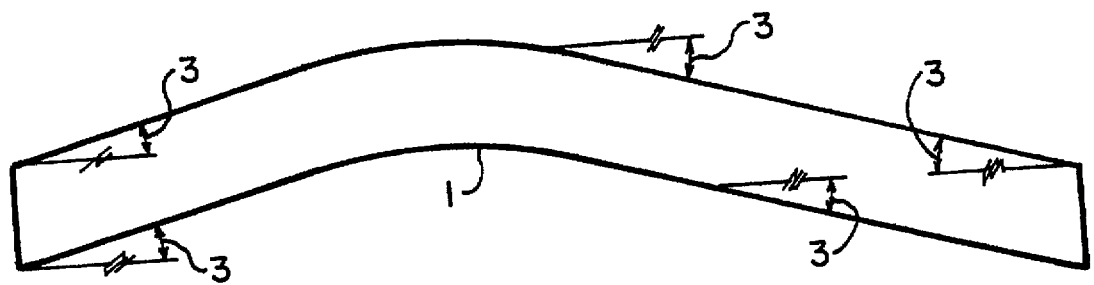
FIG. 1 is a sectional view of the walls of a separating duct.

Drawn in FIG. 1 by way of illustration is a section of the walls 1 of a separating duct in a plane containing the axis of rotation 2. The angles 3 which the walls form with the axis of rotation are indicated at various positions.

Figure 2:
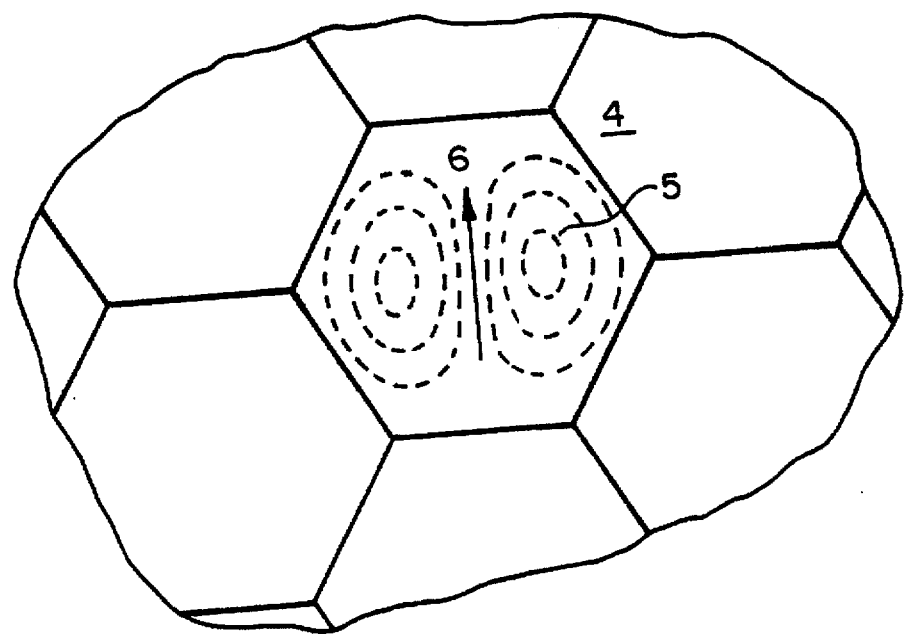
FIG. 2 is a sectional view of a circular separating duct.

Drawn by way of illustration in FIG. 2 is a section of a circular separating duct 4 which forms part of a bundle of ducts according to the invention. When the walls of this duct are not parallel to the axis of rotation in the manner as shown for instance in FIG. 1, circulatory flows 5 will develop as a result of Coriolis forces. The flow pattern consist of two cells as designated in FIG. 2, wherein the flow pattern is a consequence of the Coriolis force 6 which acts in a direction perpendicularly of the axis of rotation and perpendicularly of the axial velocity of the fluid through the duct. Due to the circulatory flow, particles are carried a shorter distance from the separating walls. The radial transport of particles resulting from centrifugal action is thus enhanced.

The degree of inclination of the separating ducts is however subject to limits. If the inclination is too large the convective fluid flows will begin to predominate as a result of Coriolis forces. In such a case particles will substantially follow the closed circulations of the fluid due to the Coriolis forces. The centrifugal force which acts on a particle and which is primarily responsible for moving a particle to a radially placed wall has in this case become too small. Particles will to a significant extent no longer reach the walls and be carried away with the fluid.

Of importance is the insight that the magnitude of these circulation flows must be limited to a value corresponding with the radial migration speed of the particles due to centrifugal action. This means that the angle a non-parallel duct forms with the axis of rotation, the rotation speed, the radial width and the length of the duct as well as the kinematic viscosity of the fluid that flows through the duct must be selected in mutual dependence in a manner such that a certain dimensionless number formed by these parameters must lie within certain values.

The present invention therefore relates to a separating body which can be set into rotation to separate solid or liquid particles of micron or sub-micron size from a fluid, wherein the relevant body consists of a large number of separating ducts with singly connected walls over a substantial part of the axial length, characterized in that walls of at least one of the separating ducts are not parallel to the axis of rotation and that the tangent of the angle between the tangent planes of the walls of the separating duct and the axis of rotation designated with tan α, the radial width of the separating duct designated with d, the length of the separating duct designated with L and the rotation speed of the separating body designated with Ω are chosen in mutual dependence in a manner such that the dimensionless number $(\Omega\,Ld\,\tan\alpha)/\nu$ is located over a substantial part of the separating duct in the range up to 192, wherein ν the kinematic viscosity of the fluid.

In the separating body the number of separating ducts in radial direction is generally greater than 10, such as 15 to 1000, more preferably about 20 to 500. The number of non-parallel separating ducts is generally more than 20 to 30%, for instance more than 60% or 90%. In preference virtually all the separating ducts are non-parallel in the manner described.

For optimum enhancement of the separating process it is further recommended that the dimensionless number lies within the range 1–192, preferably 1–140 and more preferably 1–96. In general the number lies below 192, more preferably below 140, and a lower limit is generally 0.1, for instance 1 to 5 or 2 to 10.

In preference the separating body is provided with a spray or spouting unit for removal from a separating duct of particles separated therein with spray or spouting medium through the duct, so that during operation or non-operation separated particulate material can be removed rapidly and efficiently via and from each separating duct.

The particle separator can optionally be provided with two or more separating units with separating ducts of different diameters. A pre-separation of coarser particles can thus be performed, whereby blockage of the narrower separating ducts by coarser particles is avoided. Instead of an additional separating unit use can also be made of an extended rotor outer wall on which blown-back particles are collected during regeneration.

It the case the separating body is rotatable drivable with a motor or via a pulley which is fixed flexibly to a frame the axis of symmetry will, in the case of imbalance because the separating body is suspended on one side, follow a path in the form of a conical plane, in which case the separating ducts can be parallel to the axis of symmetry but due to imbalance now incline at an angle a relative to the axis of rotation.

If in further preference the separating body is provided with fluid inlet and/or fluid outlet means such that the centrifugal pressure increase is equal to or greater than the pressure fall over the separating body, short-circuit flows are avoided and sealing means can optionally be dispensed with.

The invention further relates to a separating unit provided with at least two separating bodies.

The invention also relates to a separating body which can be set into rotation to separate solid or liquid particles of micron or sub-micron size from a fluid, wherein said body consists of a large number of separating ducts with singly connected walls over a substantial part of the axial length, which is characterized in that it is provided with a spray or spouting unit for removal from a separating duct of particles separated therein with spray or spouting medium through the duct.

The invention also relates to a separating body which can be set into rotation to separate solid or liquid particles of micron or sub-micron size from a fluid, wherein said body consists of a large number of separating ducts with singly connected walls over a substantial part of the axial length, which is characterized in that the separating body is rotatably drivable with a motor or pulley which is fixed flexibly to a frame.

The invention also relates to a separating body which can be set into rotation to separate solid or liquid particles of micron or sub-micron size from a fluid, wherein said body consists of a large number of separating ducts with singly connected walls over a substantial part of the axial length, which is characterized in that it is provided with fluid inlet and/or fluid outlet means such that the centrifugal pressure increase is equal to or greater than the pressure fall over the separating body.

In these latter embodiments, that one or more separating ducts are non-parallel is not an essential condition for achieving the effects of the invention. This implies that the dimensionless number is smaller than 192 without a condition for the lower limit thereof.

In one embodiment of the separating body according to the invention the separating ducts consist of corrugated material wrapped round a shaft or pipe. The material can consist of paper, cardboard, foil, metal, plastic or ceramic.

In a further embodiment of the separating body according to the invention the separating ducts are formed by ducts in a perforated or otherwise axially porous body.

In a further embodiment of the separating body according to the invention the separating ducts are formed by concentric cylinders, wherein the space between the cylinders is intersected by a tangential wall.

In yet another embodiment of the separating body according to the invention the hydraulic diameter of the separating ducts and the average through-flow speed of the fluid in the separating ducts are chosen in mutual dependence in a manner such that the Reynolds number is smaller than 2300, and preferably smaller than 2000, thereby ensuring a laminar flow in the separating duct.

Ducts which are not parallel to the axis of rotation can be produced by means of the fabrication and/or assembly process of the separating body according to the invention. A non-parallel position also results if the separating body has a certain degree of imbalance. Particularly when the separating body is spring-mounted in a housing, for example in a manner analogous to the construction of a spin-drier, the separating body will rotate due to imbalance on an axis forming an angle with the axis of symmetry of the separating body.

In practice the ratio of length to radial width of a separating duct of the separating body according to the invention is large, and in any case larger than 5. Consider now the case of a separating body which rotates at an angular speed of 75 rad/s and has flowing through it air with a kinematic viscosity of $1.5\times10^{-5}\,m^2/s$. At a duct length of 500 mm and a radial width of 3 mm the angle of inclination of the separating ducts according to the invention muse then be limited to 1.5 degrees of arc. At a duct length of 200 mm and a radial width of 0.5 mm the angle of inclination of the separating ducts according to the invention must be limited to 21 degrees of arc.

Figure 3:
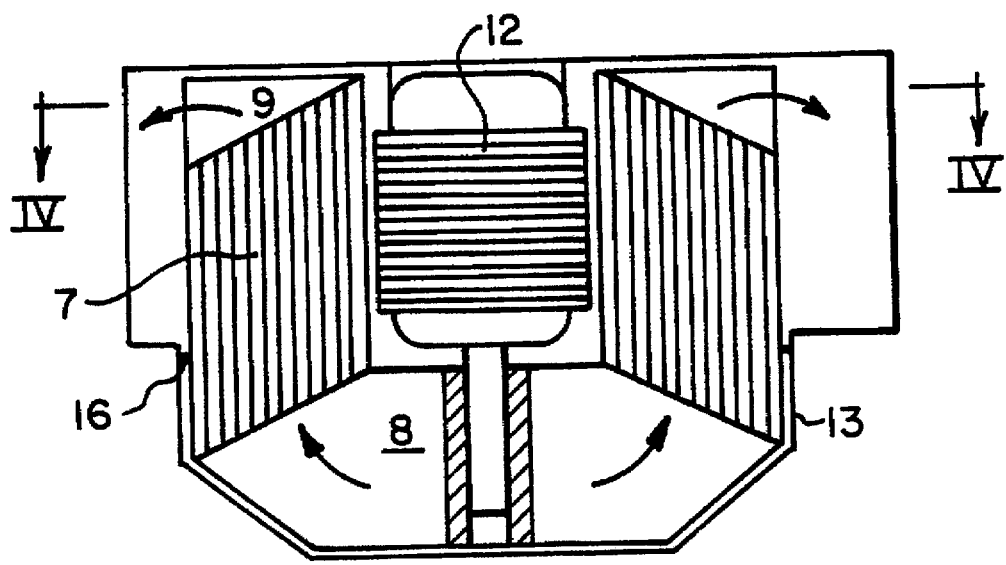
FIG. 3 is a longitudinal sectional view of a particle separator.
Figure 4:
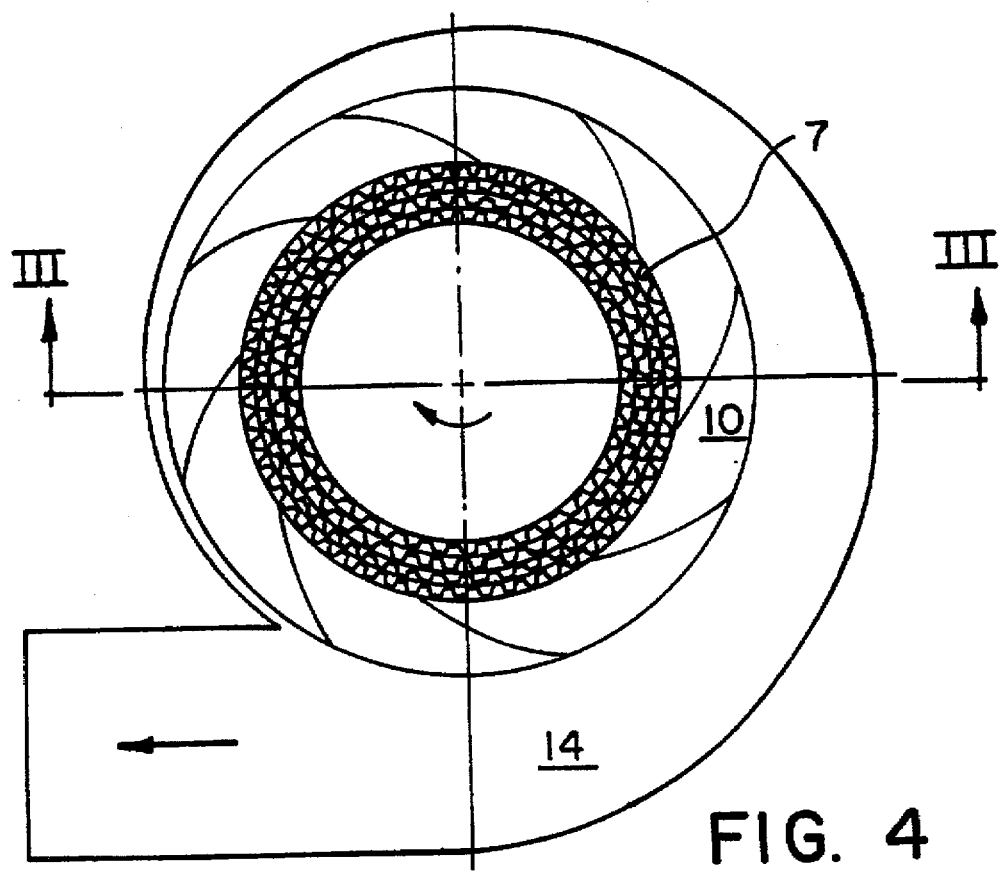
FIG. 4 is a cross-sectional view of a particle separator.

Shown in FIG. 3 and FIG. 4 are schematic drawings of a longitudinal section and a cross section of a particle separator provided with a separating body with separating ducts 7 according to the invention. Situated upstream and downstream of the separating ducts are fluid guiding means, for instance impellers 8 and 9, provided with blades 10 which may or may not be curved. Fluid guiding means and separating ducts are mounted on a shaft 11 which is driven by motor 12. The whole is enclosed in a housing 13 provided with a volute 14.

The gas 15 for cleaning enters the housing axially on the underside and is set into rotation by means of inlet impeller 8 and guided into the rotating separating ducts 7. Due to centrifugal action in combination with circulatory flows resulting from a limited inclination of the ducts according to the invention, an inclination which is not explicitly indicated in FIG. 3 and FIG. 5, liquid particles and solid particles separate from the gas and deposit on the outer walls of the separating ducts. The gas with particles removed leaves the ducts via the outlet impeller 9 to leave the housing via volute 14. The particle material collected in the separating ducts can be removed by taking the separating body out of the housing and subsequently cleaning or replacing it with a new body. The separating body can also be cleaned in situ, for instance applying vibrations, by generating sound waves or, preferably, by spraying or spouting through the ducts with air or other gaseous or a liquid medium under pressure.

Possible leakage flows of cleaned gas at the outlet to the uncleaned gas at the entry or vice versa via the intermediate space between housing 13 and separating body 7 can be prevented by arranging seal 16. Such leakage flows can be likewise or further controlled by a suitably chosen pressure distribution in the particle separator. As a consequence of centrifugal action gas flowing through impeller 8 and 9 in radial sense will undergo an increase in pressure. If this pressure increase is equal to the pressure fall due to resistance the gas encounters when flowing through the separating ducts 7, the pressure at the outlet 14 will be the same as that in the entry 15 and no leakage flows will occur via the intermediate space. If the rotating particle separator is designed such that the centrifugal pressure build-up of the gas is slightly greater than the pressure fall over the ducts, only a small back-flow of cleaned gas to uncleaned gas will take place. Special or high-grade seals 16 are not then necessary. Characteristic for such an embodiment is that the separating body and the gas guiding means are constructed such that the cleaned gas exits at a radius which is greater than the radius at which the gas for cleaning enters.

Figure 5:
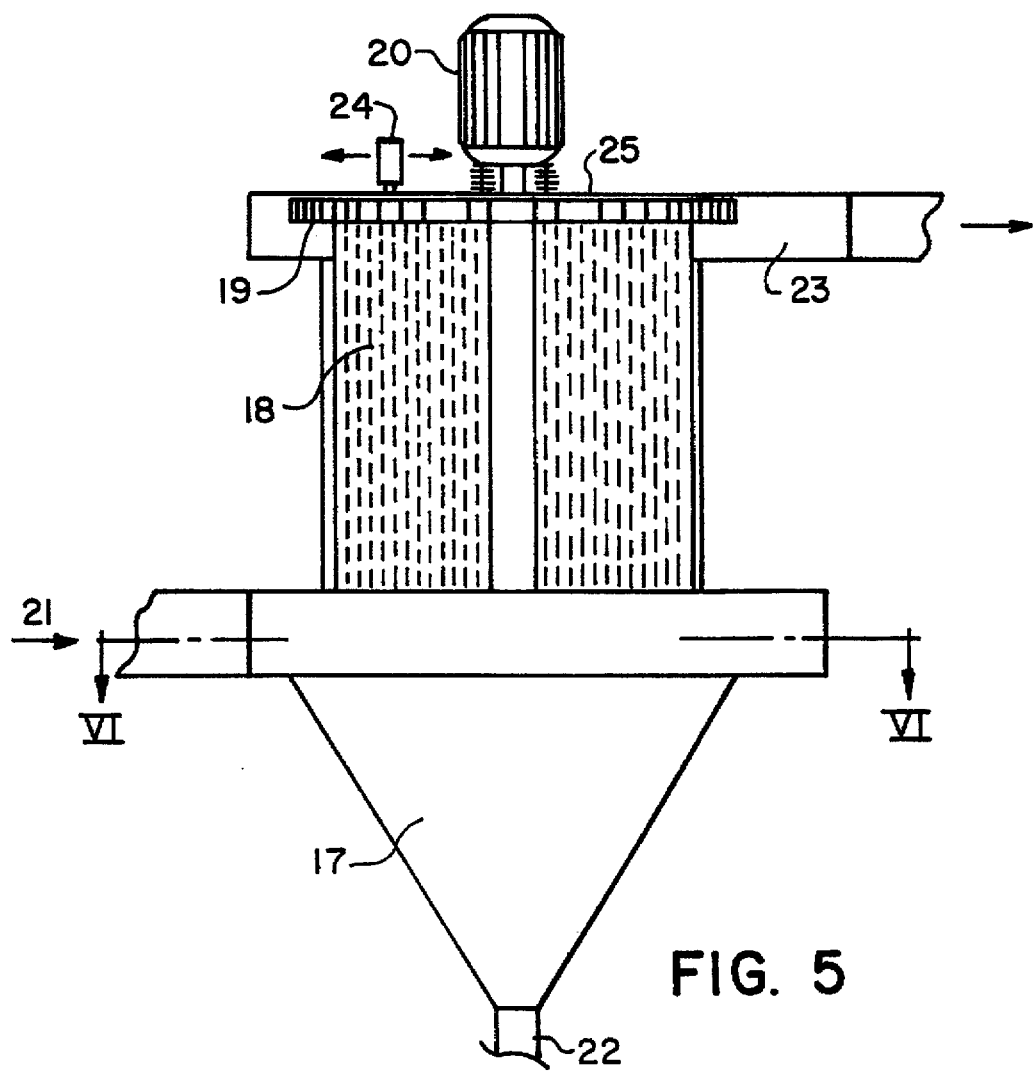
FIG. 5 is a side view of a particle separator.
Figure 6:
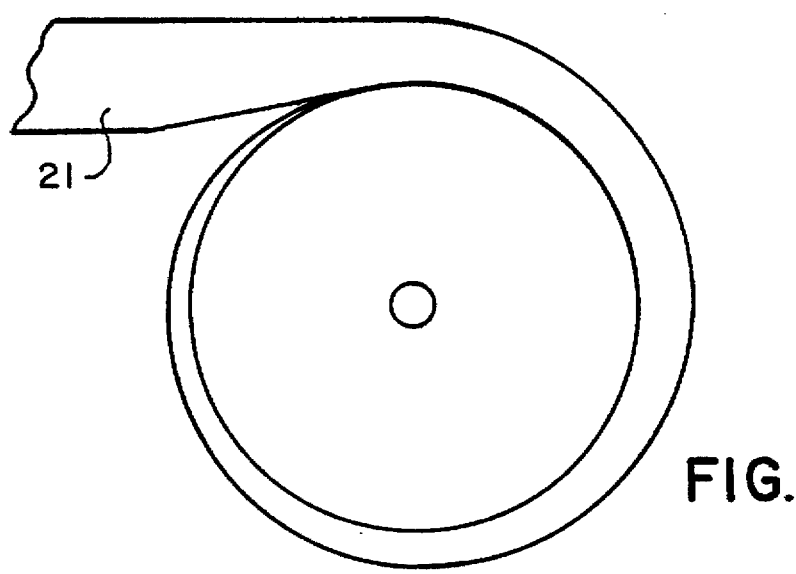
FIG. 6 is a bottom view of a particle separator.

An example of another possible embodiment of the rotating particle separator provided with a separating body according to the invention is shown in FIG. 5 and FIG. 6. Characteristic for this embodiment is a tangential inlet 17 which is placed upstream of the rotating separating body 18 which is provided with impeller 19 and is driven by motor 20. The gas for cleaning flows tangentially 21 into the cyclone-like inlet housing 17. As a result of centrifugal action due to the rotating movement of the gas in the inlet housing the coarser particles in the gas will be flung outward and leave the inlet housing via funnel 22. The finer particles will subsequently be separated in the separating ducts of the separating body. The gas with the particles removed leaves the rotating particle separator via impeller 19 and the volute outlet housing 23.

The particle material collected in the ducts can be removed periodically using a spray or spouting unit 24 which is horizontally displaceable over the ducts and which sprays or spouts air or another gaseous or a liquid medium through the ducts in upstream direction. Collected particle material is then moved to inlet housing 17 and leaves the rotating particle separator via funnel 22. This process can take place both during standstill and during rotational operation. In the latter case the particle material blown out of the rotating separating body will be flung into the cyclone-like inlet housing 17 and, as in the pro-separation of coarser particles, leave the inlet housing via funnel 22. By causing the blowing in upstream direction to take place in dosed and directed manner the separating process of the rotating particle separator is only disturbed to a small extent and regeneration of the rotating particle separator can take place without it having to be rendered inoperative and the separating process interrupted.

Motor 20 is attached to the housing flexibly by means of springs and/or dampers 25. This achieves that imbalancing forces, which act on bearings and housing during rotation, are minimal. The spring stiffness and/or damping force is chosen such that the angle α between axis of rotation and walls of the separating ducts resulting from imbalance is in accordance with the characteristics of the separating body according to the invention.

The example of an embodiment of the rotating particle separator shown in FIG. 5 and FIG. 6 is particularly suitable for filtering gases from industrial processes with high concentrations of particle material, for instance gases from coal and waste burning plants, where concentrations of 10 to 100 gram/m$^3$ are not unusual. A significant part of the particle material often consists in such processes of coarser particles with diameters of about 10 micron and larger. This material is separated in the cyclone-like inlet whereby the concentration of particle material delivered to the rotating separating body according to the invention becomes markedly lower, for instance 1 gram/m$^3$. The time within which the ducts could become blocked can thereby be considerably extended, for example to more than an hour. Within this time compass the spray or spout unit 24, such as an air jet, is set into operation in order to clear the separating body of particle material in good time and to allow the separating process to continue uninterrupted.

Concentrations of particle material in outside air are markedly lower than those usual in industrial process gases. The concentrations of particle material in outside air are generally lower than 1 milligram/m$^3$. When the rotating particle separator according to the invention is used for purpose of air filtering the separating body will only become saturated after a long period of use which can amount to more than a year. In situ cleaning is then less necessary and the embodiment with axial inlet as shown in FIG. 3 and FIG. 4 is appropriate for such an application.

The rotating particle separator with non-parallel separating ducts is suitable for separating both solid and liquid particles out of fluid. After being flung out into the separating ducts liquid particles will form a liquid film on the radial walls of the separating ducts. As a result of the force of gravity the liquid film will move downward in the case of vertical placing of the walls of the separating ducts. The liquid leaves the ducts on the underside where, as a result of the centrifugal force, the liquid is thrown out in the form of droplets. These droplets can be drained by means of suitable provisions. For example, in the case of the embodiment as shown in FIG. 5 and FIG. 6, the droplets will fall into the cyclone-like inlet space and leave the rotating particle separator via the funnel. In the case of the embodiment shown in FIG. 3 and FIG. 4, the droplets can leave the rotating particle separator through holes arranged in the radial walls of the inlet impeller.

The liquid film occurring on the walls of the separating ducts in the case of liquid particle material will then only move downward when the liquid is subjected to a downward force. In the case the ducts are in inclining position a situation can occur wherein the downward oriented force of gravity is neutralized by the component of the centrifugal force which occurs in the lengthwise direction of the duct in the case of an inclining position. Such a situation can be prevented by limiting the inclination of the ducts to an angle whose tangent is smaller than the ratio of gravity and centrifugal force.

The rotating particle separator according to the invention can be a component of a chemical or physical process. Extremely fine particles can be dispersed in the fluid at or prior to entry into the cyclone-like inlet housing or by means of the spray unit 24 and can thus bring about a chemical or physical conversion of the fluid or parts of the fluid by absorption, desorption, adsorption, chemical reaction or catalytic reaction. The fine particles are separated in the rotating element. An effective rotating reactor is thus created. The fact that operations can be performed here with extremely small particles offers interesting perspectives relative to existing reactors. The comparatively large contact surface between the fluid phase and the solid phase enables short reaction and capture times. This results in a small reactor volume, or a compact structure.

The rotating particle separator with non-parallel separating ducts can also be used for separating condensable fluid-like components which are present in a fluid; for example, drying of air. Setting the fluid into rotation before entry into the separating ducts of the separating body according to the invention can take place such that cooling occurs for instance due to expansion, and vapour-form components in the fluid condense to mist droplets. These droplets are separated in the separating ducts, whereafter the dried fluid leaves the rotating particle separator via the outlet impeller where the dried fluid is brought to the desired pressure and temperature. Using the rotating particle separator a thermodynamic process is thus brought about wherein a fluid in vapour form is fractionated into a drier fluid and condensate of lower temperature. Such a process can be applied inter alia as alternative to existing energy conversion systems including cooling systems based on freon, heating devices and heat pumps.

The rotating particle separator with non-parallel separating ducts according to the invention is also suitable for use in conditions wherein the fluid is under high pressure. In such applications the housing of the rotating particle separator can be constructed such that it is pressure-resistant, or the rotating particle separator as a whole can be placed in a separate pressure vessel. Possible sealing problems at the lead-through of the drive shaft of the rotating particle separator can be solved by also displacing the drive inside the pressure vessel. In this manner very high pressures can be permitted up to 400 bar. High temperatures can also be permitted through suitable choice of material and by arranging cooling devices. With the use of high-grade metal alloys fluid temperatures of up to about 800° C. can be permitted. If the internal components of the rotating particle separator according to the invention are made of ceramic, temperatures of up to 1600° C. can be permitted.

The particle separators shown in FIG. 3, FIG. 4, FIG. 5 and FIG. 6 are only examples of possible embodiments of particle separators provided with separating body according to the invention. Subject to the type of application many other embodiments are possible. Characteristic herein is that the particle separators are provided with a separating body according to the invention, that impellers may or may not be arranged upstream and downstream of the separating body and that the separating body may or may not be placed in a housing provided with fluid inlet and fluid outlet and optionally a separate outlet for removing separated particle material.

In the filtering of large quantities of fluid there is the possibility of placing in parallel a plurality of rotating particle separators according to the invention. The fluid flow for filtering is divided over the different rotating particle separators for subsequent collection, after filtering, in a collective discharge conduit. Since each rotating particle separator can be designed such that the pressure in the fluid outlet is at least equal to the fluid pressure in the inlet, each rotating particle separator pumps its own fluid flow. If a rotating particle separator comes to a desired or undesired standstill in such an arrangement of rotating particle separators placed in parallel, the fluid flow through the rotating particle separator that has come to a standstill will also stop. The arranging or valves in the feed and/or discharge conduits of the rotating particle separators, in order for instance to isolate a rotating particle separator that has come to a standstill from the other operating rotating particle separators, is not necessary. Scaling up to installations of large numbers of rotating particle separators according to the invention placed in parallel can thus take place in comparatively simple manner, wherein in order to reduce costs optional use can be made of a collective housing. This results in an installation whose filtering capacity is relatively unaffected by possible breakdown of a single unit.

The rotating particle separator according to the invention offers the possibility of removing solid and liquid particles of micron and sub-micron size from small and large quantities of hot or cold fluid flows under high or low pressure in an exceptionally efficient and economic manner. Experiments performed with diverse prototypes exhibited excellent and consistent separating performances with low energy consumption. Tests were performed with, among others, an apparatus with a cylindrical separating body with a diameter of 0.3 m and a length of 0.5 m provided with hexagonal separating ducts with a width of 3 mm. The body rotated at an angular speed of 300 rad/s and flow rate therethrough was 1000 $m^3$/hr. Extremely fine solid particles with diameters in the micron and sub-micron range were dispersed with concentrations of about 1 g/$m^3$ in the inlet air and subsequently separated in the ducts of the separating body. Using cascade impactors it was determined that all particles with an aerodynamic diameter of 1 micron and greater were separated for practically 100% in the separating body.

Separation efficiencies for particles with aerodynamic diameters of 0.1 micron to 1 micron varied between 85 and 100%. Saturation of the ducts occurred after feed of about 1 kg particle material. Total energy consumption, inclusive pressure loss and electrical energy consumption by the drive motor, amounted to about 1000 Pa expressed in power per unit of air flow.

The separating body of the test apparatus was spring mounted on the housing in analogy with the construction shown in FIG. 5. As a result of imbalance there occurred during rotation an angle of inclination between separating ducts and axis of rotation of roughly 0.13 degrees of arc. This is in accordance with the characteristics of the separating body according to the invention, according to which in the present case a maximum angle of inclination of about 0.37 degrees of arc is allowed. Experiments were also performed wherein the imbalance was deliberately increased such that the angle of inclination was greater than 0.37 degrees of arc. A marked decrease in the extent of separation of particle material was herein observed.

The experiments performed with the prototypes of the rotating particle separator according to the invention revealed excellent particle separative performance. Enhanced separative performance, in particular for particles in the sub-micron range, was due to electric forces. Electric fields develop in the rotating body of the rotating particle separator, among others as the result of friction exerted between the rotating body and the fluid containing the particles. These fields support the migration process of the particles which more towards the collecting walls of the separating ducts of the rotating particle separator. The beneficial effect of the electric fields can be further stimulated by loading the particles in the fluid by creating an electrostatic field, for example by applying differential voltage over plates or by inserting an ionizer.

The rotating particle separator with non-parallel separating ducts according to the invention offers the possibility of removing solid and liquid particles of micron and sub-micron size from small and large quantities of hot or cold fluid flows under high or low pressure in extremely efficient and economic manner. It is an interesting alternative to existing filtering methods and also offers interesting perspectives for new fields of application where existing methods are not usable due to physical and/or economic limitations.

I claim:

1. A rotatable separating body for separating solid or liquid particles of micron or sub-micron size from a fluid, comprising a plurality of separating ducts including singly connected walls over a substantial part of axial length of said body, wherein said walls of at least one of the separating ducts are not parallel to an axis of rotation of the separating body and that a tangent of an angle between tangent planes of the walls of the at least one separating duct and the axis of rotation designated with tan $\alpha$, a radial width of the at least one separating duct designated with d, a length of the at least one separating duct designated with L and a rotation speed of the separating body designated with $\Omega$ are chosen in mutual dependence in a manner such that a dimensionless number $(\Omega L d \tan \alpha)/v$ is located over the length L and the width d of the at least one separating duct in the range up to 192, wherein $v$ is kinematic viscosity of the fluid.

2. The separating body as claimed in claim 1, wherein the dimensionless number lies within the range 1–192.

3. The separating body as claimed in claim 2, wherein said body includes a spray or spouting unit for removal of particles from the at least one separating duct utilizing a spray or spouting medium blown through the at least one separating duct.

4. The separating body as claimed in claim 3, wherein the spray or spouting unit is displaceable over and positionable above each separating duct.

5. The separating body as claimed in claim 4, wherein said separating body is rotatably drivable with a motor which is flexibly attached to a frame.

6. The separating body as claimed in claim 5, wherein said separating body includes a fluid inlet and/or fluid outlet means such that centrifugal pressure increase over the separating body is equal to or greater than pressure decrease over the separating body.

7. The separating body as claimed in claim 6 wherein the separating ducts are formed by corrugated material wrapped around a shaft or pipe.

8. The separating body as claimed in claim 7, wherein the separating duct is formed from a perforated or porous body.

9. The separating body as claimed in claim 8, wherein the separating ducts are formed from concentric cylinders and wherein an annulus is intersected by a tangential wall.

10. The separating body as claimed in claim 9, wherein hydraulic diameter of the separating ducts and average through-flow speed of the fluid in the separating ducts are chosen in mutual dependence in a manner having a Reynolds number of less than 2300 whereby a laminar flow is obtained in the separating duct.

11. The separating body as claimed in claim 10, wherein the separating body is placed in a housing which is provided with a fluid inlet and a fluid outlet.

12. The separating body as claimed in claim 11, wherein the housing comprises cyclone-shaped parts.

13. The separating body as claimed in claim 12, wherein said body includes a means for allowing a chemical, physical and/or thermodynamic process to proceed.

14. The separating body as claimed in claim 13, wherein said body has a means for electrically loading the particles to be separated.

\* \* \* \* \*